United States Patent
Daly et al.

(10) Patent No.: US 7,774,407 B2
(45) Date of Patent: Aug. 10, 2010

(54) POSTPONING AN INSTANT MESSAGING SESSION

(75) Inventors: Orla Daly, Meath (IE); Sonya Purcell, Tipperary (IE); Cora Clerkin, Monaghan (IE); Patrick Joseph O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/690,112

(22) Filed: Mar. 22, 2007

(65) Prior Publication Data

US 2007/0266096 A1    Nov. 15, 2007

(30) Foreign Application Priority Data

May 9, 2006    (GB)    ................................ 0609070.8

(51) Int. Cl.
  *G06F 15/16*    (2006.01)
  *G06F 15/173*   (2006.01)
  *G06F 15/177*   (2006.01)

(52) U.S. Cl. ....................... 709/204; 709/228; 709/206; 709/207; 715/758

(58) Field of Classification Search ......... 709/200–204, 709/217–228
See application file for complete search history.

(56) References Cited

U.S. PATENT DOCUMENTS

| 7,509,388 B2 * | 3/2009 | Allen et al. ................. 709/207 |
| 2004/0128181 A1 | 7/2004 | Zurko et al. |
| 2004/0174392 A1 * | 9/2004 | Bjoernsen et al. ........... 345/751 |
| 2004/0205134 A1 | 10/2004 | Digate et al. |
| 2005/0080859 A1 * | 4/2005 | Lake ........................... 709/206 |
| 2006/0031326 A1 * | 2/2006 | Ovenden .................... 709/206 |
| 2006/0036688 A1 | 2/2006 | McMahan et al. |
| 2006/0129643 A1 * | 6/2006 | Nielson et al. ............. 709/206 |
| 2007/0168444 A1 * | 7/2007 | Chen et al. .................. 709/207 |
| 2007/0168447 A1 * | 7/2007 | Chen et al. .................. 709/207 |
| 2008/0270916 A1 * | 10/2008 | Chen et al. .................. 715/758 |

FOREIGN PATENT DOCUMENTS

EP    1209849    5/2002

* cited by examiner

*Primary Examiner*—Haresh N Patel
(74) *Attorney, Agent, or Firm*—David A. Dagg

(57) ABSTRACT

A method of operating an instant messaging application comprises running an instant messaging dialogue session across a plurality of participant devices. When a user wishes to postpone the session, the application receives a postponement signal from a participant device, determines a future restart time and future participant devices, terminates the current instant messaging dialogue session, and initiates a new instant messaging dialogue session at the restart time for the future participant devices.

21 Claims, 5 Drawing Sheets

POSTPONING AN INSTANT MESSAGING SESSION

CROSS REFERENCE TO RELATED APPLICATIONS

The present application claims priority under 35 USC 119 to United Kingdom Application Number GB0609070.8, filed May 9, 2006.

FIELD OF THE INVENTION

This invention relates to a method of and system for operating an instant messaging application.

BACKGROUND OF THE INVENTION

Instant messaging applications are well-known software applications used to allow multiple users to have online conversations. Each user will have an application window running on their desktop, which maintains the current conversation. When any user types in new text in the application window and hits send (or presses return), this new text is added to the current conversation, and can be seen by all users including the person who has sent the new text. Instant messaging conversations can be between just two people or several people at the same time. The same user can hold more than one conversation at the same time with different people, as separate application windows on their desktop.

Conventional instant messaging (IM) software applications allow users to conduct real-time conversations, but there are situations when it is not convenient for both parties to carry out the conversation to completion. Current applications do not possess the option to continue an IM meeting at a later date with this person. Instant messaging conversations are often stochastic and few users realize that when within such a conversation there is an implied contract, and more often than not it is important for this contract to be successful. Oftentimes when this agreement is not successful on the first instance, it is never again resumed, leaving a breakdown in communication.

The inability to motivate the continuity of an instant messaging session is a significant shortfall in the existing art. Although existing products all have the ability to create instant conversations, there does not exist anything in the area of continuity of instant messaging conversations or of creating meetings on the fly in known systems such as AOL Instant Messenger, MSN Messenger, IBM's Lotus Workplace IM, or ICQ. (IBM, Lotus and Workplace are trademarks of International Business Machines in the United States, other countries or both. MSN Messenger is a trademark of Microsoft Corporation in the United States, other countries or both. Other company, product, and service names may be trademarks or service marks of others.)

It is therefore an object of the invention to improve upon the known art.

SUMMARY OF THE INVENTION

According to a first aspect of the present invention, there is provided a method of operating an instant messaging application comprising running an instant messaging dialogue session across a plurality of participant devices, receiving a postponement signal from a participant device, determining a future restart time and future participant devices, terminating the current instant messaging dialogue session, and initiating a new instant messaging dialogue session at the restart time for the future participant devices.

According to a second aspect of the present invention, there is provided a system for operating an instant messaging application comprising an instant messaging server running an instant messaging dialogue session across a plurality of participant devices, the instant messaging server arranged, following receipt of a postponement signal from a participant device, to determine a future restart time and future participant devices, to terminate the current instant messaging dialogue session, and to initiate a new instant messaging dialogue session at the restart time for the future participant devices.

According to a third aspect of the present invention, there is provided a computer program product on a computer readable medium comprising instructions for operating an instant messaging application, the instructions for running an instant messaging dialogue session across a plurality of participant devices, for receiving a postponement signal from a participant device, for determining a future restart time and future participant devices, for terminating the current instant messaging dialogue session, and for initiating a new instant messaging dialogue session at the restart time for the future participant devices.

Owing to the invention, it is possible to provide users with a simple and efficient method of postponing an instant messaging conversation in a way that allows the users to continue their meeting to a successful completion at a future time.

Existing calendaring and scheduling products are very formal and often agenda based. Usually instant messaging conversations are casual and carried out on the fly. Often users say that they will chat at a later date about a certain issue but never get round to doing so. By giving users the ability to create a formal meeting prevents some of the intermissions that occur when using instant messaging as a communication method. This invention also gives people a way to balance their workload in a more efficient way. A user can pick a time that is more convenient for them to carry out a task. The invention solves the challenge of continuing an instant messaging meeting. An agreed and formalized IM contract is established and a thread would be associated with a successful completion of the agreement. A system and method for motivating contiguity in IM conversations is provided. By following an IM meeting to completion it would prevent breaks in communication.

The invention allows the postponing of instant messaging meetings as a way to motivate continuity of an IM meeting. A way is provided to formalize an IM contract and develop the concept of creating an IM meeting/conversation. The invention solves the problems of incomplete instant messaging conversations. This creates a formal understanding between two or more users for the IM meeting to take place. The understanding that is created is not complete until the meeting has successfully concluded. As a result, this contract ensures that users have the ability to get a resolution to the issue more efficiently.

Advantageously, the method further comprises, following receipt of the postponement signal from a participant device, storing a conversation file comprising the instant messaging dialogue session and following initiation of the new instant messaging dialogue session at the restart time, displaying the conversation file at respective future participant devices of the new instant messaging dialogue session. By storing the current instant messaging conversation when it is postponed and recalling that conversation when the new session is initiated, any participants will be able to see the context of the conversation when it is resumed. This facilitates the successful completion of the original conversation.

In a first embodiment, the step of determining the restart time comprises accessing a calendar application of at least one participant device and accordingly scheduling a future restart time. In a second embodiment, the step of determining the restart time comprises receiving scheduling data from at least one participant device and accordingly scheduling a future restart time. In effect, once a participant has requested postponement, a new time has to be decided for the resumption of the instant messaging conversation. This can either be done automatically by the instant messaging server running the instant messaging application, or the participants themselves can decide the new time for the future resumption.

Preferably, the method further comprises inserting a calendar entry into a calendar application of at least one future participant device, the calendar entry comprising the scheduled future restart time. By interfacing with a calendar and scheduling application, the instant messaging application can place a calendar entry for the participants of the future instant messaging application, to assist in the scheduling of the participants workflow.

Ideally, the method further comprises, prior to initiation of the new instant messaging dialogue session at the restart time, receiving rescheduling data from at least one future participant device and accordingly rescheduling a new future restart time. The instant messaging application is improved if it can support rescheduling of the future resumption of the instant messaging application. This can be limited to just the owner (or original initiator) of the first conversation, or could be open to any of the future participants to change the time and date of the resumption.

Advantageously, the method further comprises, prior to initiation of the new instant messaging dialogue session at the restart time, transmitting a reminder signal to each future participant device. The transmission of a reminder to the future participants increases the likelihood that the original conversation will be completed at the scheduled time, without undue delay or further postponement.

Preferably, the method further comprises, immediately prior to initiation of the new instant messaging dialogue session at the restart time, determining whether each future participant device is connected to the instant messaging application, and if not, rescheduling a new future restart time. At the point when the instant messaging application is going to start a new conversation to complete the old conversation, a check is made to see if all of the participants are online (connected to the server). If one or more are not connected then the restart is automatically rescheduled for a future time, with or without reference to the participants' calendars.

BRIEF DESCRIPTION OF THE DRAWINGS

Embodiments of the present invention will now be described, by way of example only, with reference to the accompanying drawings, in which.

DETAILED DESCRIPTION OF EXEMPLARY EMBODIMENTS

Figure 1:
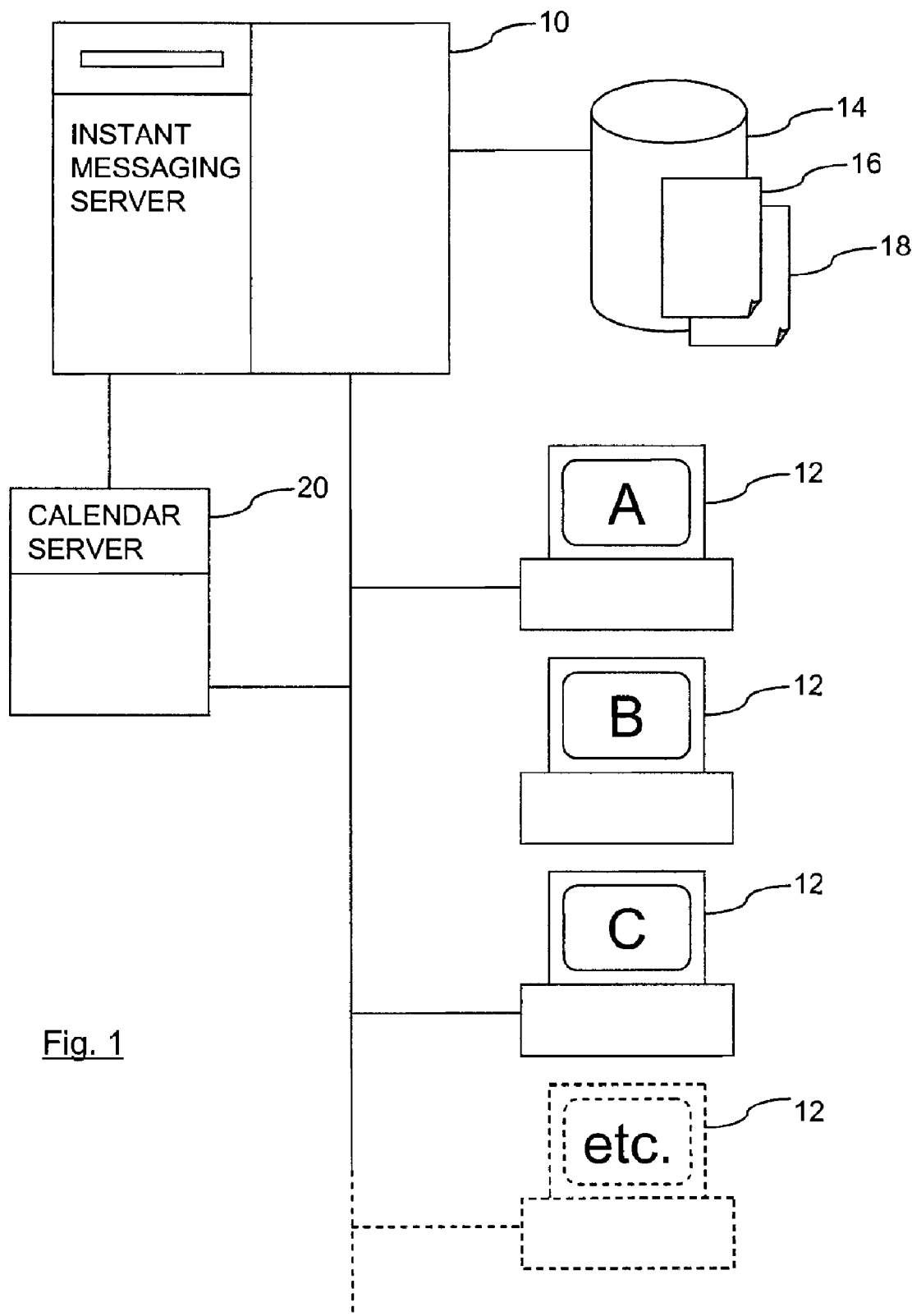
FIG. 1 is a schematic diagram of an instant messaging system.

FIG. 1 shows a system for operating an instant messaging application which includes an instant messaging server 10 running an instant messaging dialogue session across a plurality of participant devices 12. In an instant messaging system, a very large number of users can be connected to the server 10 at the same time. For simplicity, users A and C are shown as being online and connected to the instant messaging server 10. User B is currently offline and not connected to the server 10. Any user who is connected to the server 10 can initiate a conversation with any other user who is also connected. Multiple users can be included in any conversation.

The instant messaging server 10 is connected to a database 14, which maintains a record of each instant messaging dialogue session 16 and the participants 18 for each and every instant messaging conversation. With a large number of users connected, the number of currently running conversations can also be very large. These are all maintained by the instant messaging server 10 and the database 14. Also present is a calendar and scheduling server 20, which maintains the calendar and scheduling functions for the various users connected to the system. The instant messaging server 10 has direct access to the calendar server 20.

As an example of the working of a conventional instant messaging system the following scenario is used:

User A, a sales manager, contacts user B, a member of her team, to get some figures and specifications that she requires to complete a deal with a new client. As it is the end of the quarter it is vital she gets the information immediately. However, user B is just about to give a demo to an important client and so he can't talk to user A.

User B assumes user A is merely looking for any updates on his sales figures "Sorry I can't talk right now, I am about to give an important demo. I'll get back to you later". User A's reply is "OK please can you contact me when you're out from the meeting". User B agrees to do this and he logs out of his Instant Messenger and rushes out the door to the meeting. The demo ends late that evening and user B goes home but since the demo went on far longer than expected he never contacts user A.

The next day user B contacts user A to find out what she wanted yesterday. He is unaware that he was the only person with the information that user A required. So not only have they lost a very large sale but also a potential customer. All this could so easily have been avoided had user B remembered to contact user A after his meeting.

This shows the weakness of conventional systems, which do not have the scope to deal with situations when users wish to break conversations and then ensure that these are restarted at a later time.

Figure 2:
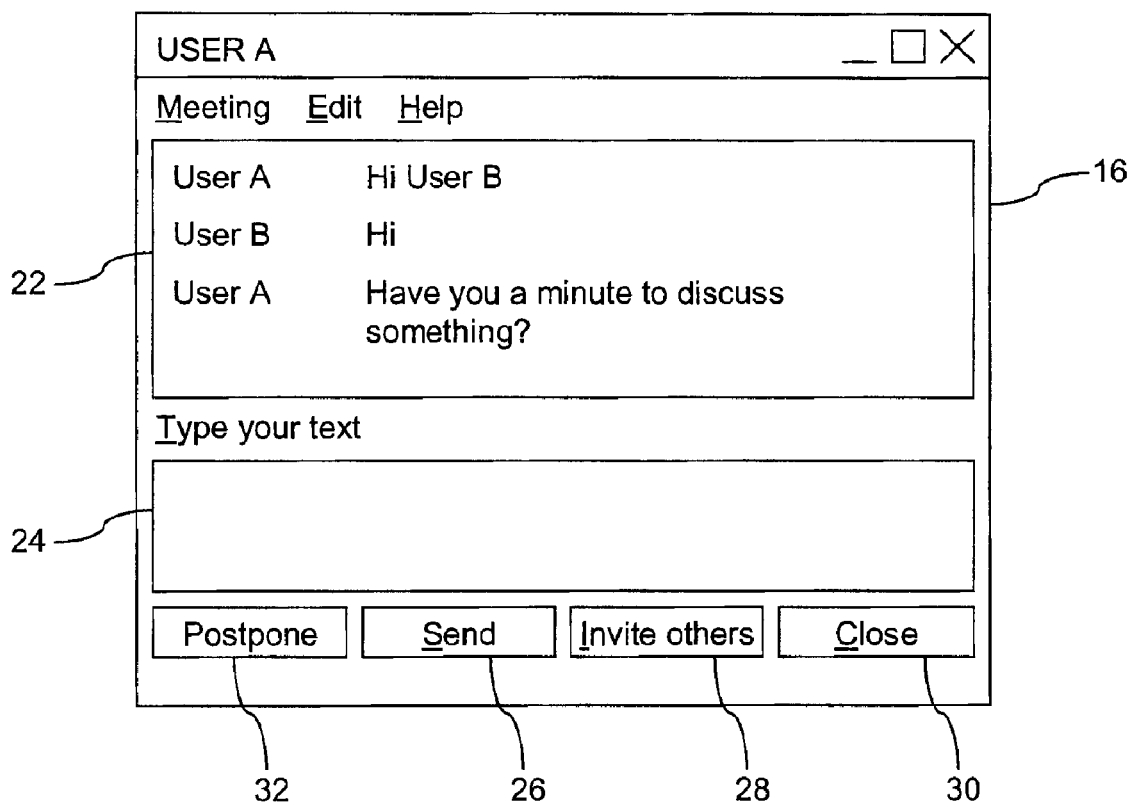
FIG. 2 is a screenshot of an instant messaging dialogue session.

FIG. 2 shows an example of a screenshot of instant messaging dialogue session 16, according to the system of the invention. The window 16 is shown as a user would see on their computer screen, once they have launched an instant messaging conversation. In the example shown in FIG. 2, user A has contacted user B, and the window 22 shows the ongoing conversation between the two users. The window 24 is where user A types in text and following pressing of a send button 20, this text is moved to window 22, which is also updated for User B, who has a similar dialogue session 16 running on their machine. In addition to the send button 26, an invite others button 28, and a close button 30 are also provided. The window also has a postpone button 32, the working of which will described with reference to FIG. 3.

Figure 3:
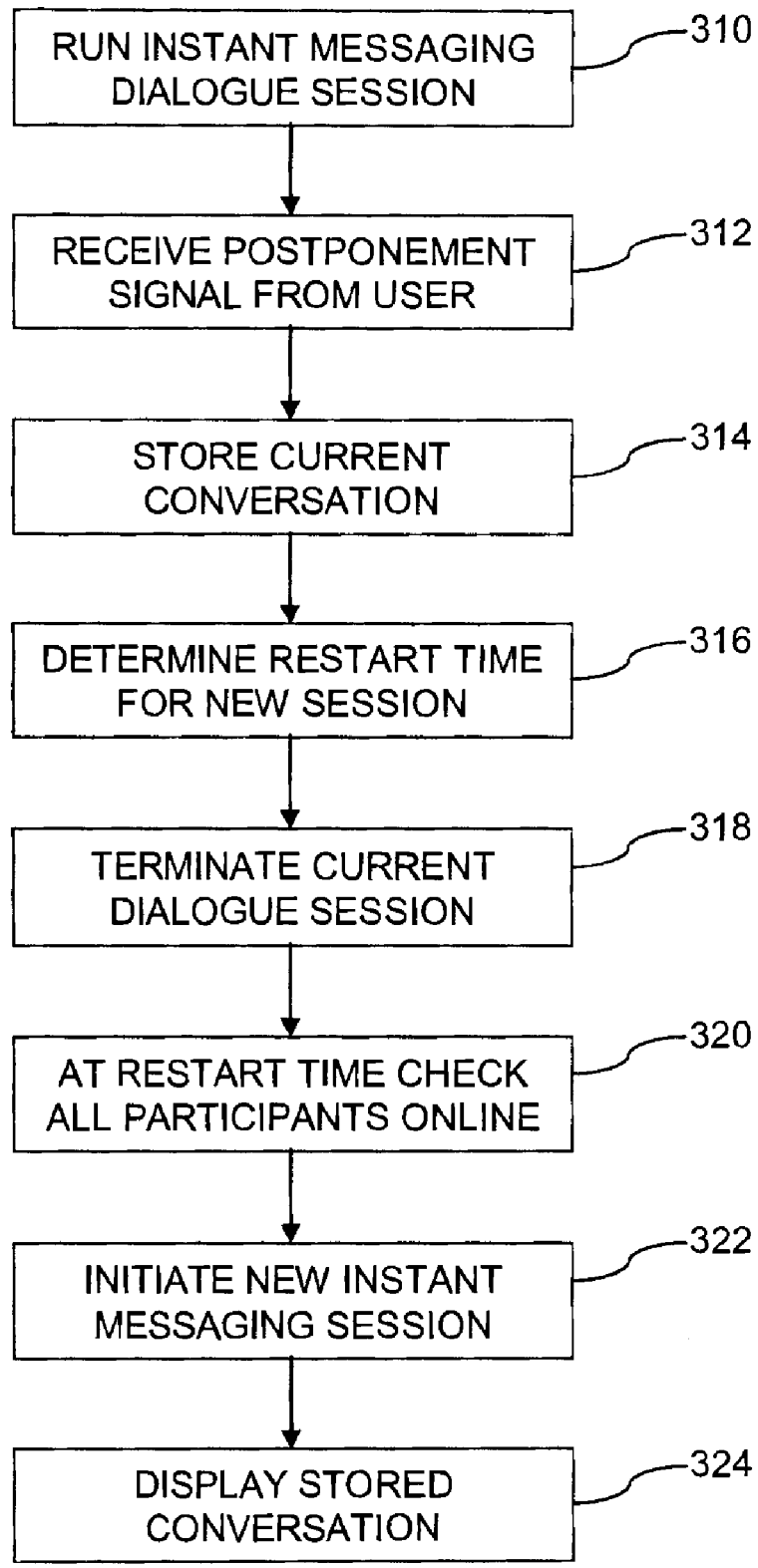
FIG. 3 is a flowchart of a method of operating an instant messaging application.

A flowchart is illustrated in FIG. 3, which shows the method carried out by the instant messaging server 10, when operating an instant messaging application according to the invention. At step 310, the instant messaging application is running an instant messaging dialogue session 16 across a plurality of participant devices 12, which could be just two devices or could be a large number of participant devices holding a simultaneous conversation.

At step 312, the instant messaging server receives a postponement signal from a participant device 12, which is triggered by a user pressing the postponement button 32 on their desktop window that shows the current dialogue session 16. By pressing that button 32, a signal is sent from the respective device 12 to the instant messaging server 10, indicating that a participating user is requesting postponement of the present session.

The postponement signal from the participant device 12 can also be generated automatically, for example, following a period of inactivity, of say five minutes. In this case the participant device 12 will decide that the current session has paused (or indeed never got started), and generate the postponement signal to transmit to the instant messaging server 10, which will proceed with the method of stopping the present session and rescheduling a new session.

Once the postponement signal is received by the server 10, the application will store (at step 314) a conversation file comprising the current instant messaging dialogue session. This will be used later when the present session is reconvened. The instant messaging application, at step 316, will determine a future restart time and the future participant devices.

The decision making process for determining the time when the conversation will be rescheduled can be done either automatically, or can be executed in a dialogue with the present participants (or controlled singly by the originator of the messaging conversation). For example, if the process is carried out automatically, the server 10 can access a calendar application, run by the calendar server 20, of at least one participant device 12 and accordingly scheduling a future restart time, based on free spaces in the calendar of one or more participants. If the process is not done automatically, then the server 10 can receive scheduling data from at least one participant device 12 and accordingly scheduling a future restart time.

It is assumed that the participants of the rescheduled instant messaging session will be the same as the original participants, and this will be the default setting for the construction of the future participant list. However, the possibility exists for participants to decline participation in the rescheduled session, which would see their details deleted from the list of future participants.

Once a restart time has been decided, then the server 10 terminates the current instant messaging dialogue session at step 318. The server stores in the database 14 a time and date for the restart of the now terminated instant messaging session. At this time, the instant messaging server can also be arranged to insert calendar entries into the calendar applications of the future participants, the calendar entries comprising the scheduled future restart time, which improves the performance of the overall system.

Prior to initiation of the new instant messaging dialogue session at the future restart time, the owner of the original session can reschedule the future session and therefore send data from a participant device 12 to the server 10, which will accordingly rescheduling a new future restart time for the resumption of the instant messaging session.

Prior to initiation of the new instant messaging dialogue session at the restart time, the server 10 can be arranged to transmit a reminder signal to each future participant device 12. Immediately prior to the initiation of the new instant messaging dialogue session at the restart time, at step 320, the server 10 determines whether each future participant device is connected to the instant messaging application, and if not, reschedules a new future restart time. This ensures that those participants designated as joining in the new session are actually online and present at the agreed time for the new session. If they are not available, then a rescheduling is carried out automatically by the instant messaging application being run by the server 10.

If all of the designated future participants are online, then the server 10 initiates a new instant messaging dialogue session, at step 322, at the restart time for the future participant devices. Following initiation of the new instant messaging dialogue session at the restart time, the original stored conversation file is displayed at respective the participant devices 12 of the new instant messaging dialogue session, so that the users that are in the new session can understand the context of the discussion that is being restarted, which could be happening several days after the original termination that occurred at step 318.

The functioning of the method of operating the instant messaging system is illustrated below with reference to specific examples of the functioning of the system.

EXAMPLE 1

1. Cora contacts Sonya using the instant messaging application, but Sonya is unable to chat to her now as she has to attend a meeting. Cora clicks the postpone button 32 and a time which is more suitable to all parties is chosen.

2. When the time for the meeting arrives the instant messaging application automatically starts and Cora can begin her chat.

3. The instant messaging application will incorporate the original text of the conversation, so that all parties involved understand the reason for the session.

4. The contract is now complete once the instant messaging application conversation is complete.

EXAMPLE 2

1. An arranged meeting does not occur when it is expected because Martha is not present at her desk when the instant messaging application launches.

2. After 5 minutes of inactivity Will gets an option that allows him to pick a new time to suit him by choosing a free slot in his calendar.

3. A new contract is created from this action and the cycle beings again.

4. The aim is to have an instant messaging contract that can be successfully concluded.

EXAMPLE 3

Hannah and Kate work on the same project but are located in different countries and very different time zones. Hannah checks her mail at her desk and then spends much of her morning in the lab and the afternoons at meetings or at her desk. By the time Hannah gets back to her desk she has often missed an instant messaging session from Kate who has left for the day. As a result Kate and Hannah often miss vital information from each other.

1. Kate contacts Hannah and after 5 minutes of inactivity Kate gets the option to schedule an IM meeting.

2. Kate chooses a time that she knows Hannah will be at her desk.

3. When the time for the meeting arrives the instant messaging application automatically starts and Kate and Hannah can begin their chat.

4. This IM will incorporate the original text of the IM so that all parties involved understand the reason for the chat.

5. The contract is now complete once the IM meeting is complete.

EXAMPLE 4

There is also a situation where there may be a number of users who need to be part of a specific chat but the time is not suitable for all of the parties that are involved. In this instance, a scheduled chat would make a lot of difference, as it would allow each of the users to chat and complete their business at time that was agreeable to all involved.

1. Orla contacts Cora and Sonya through the instant messaging client with a query regarding a problem that she has at the moment.

2. Unfortunately Cora is unable to chat at the present time, but she has time later in the day. Although Sonya is able to chat at this time, Orla needs collaborative input from both people.

Figure 4:
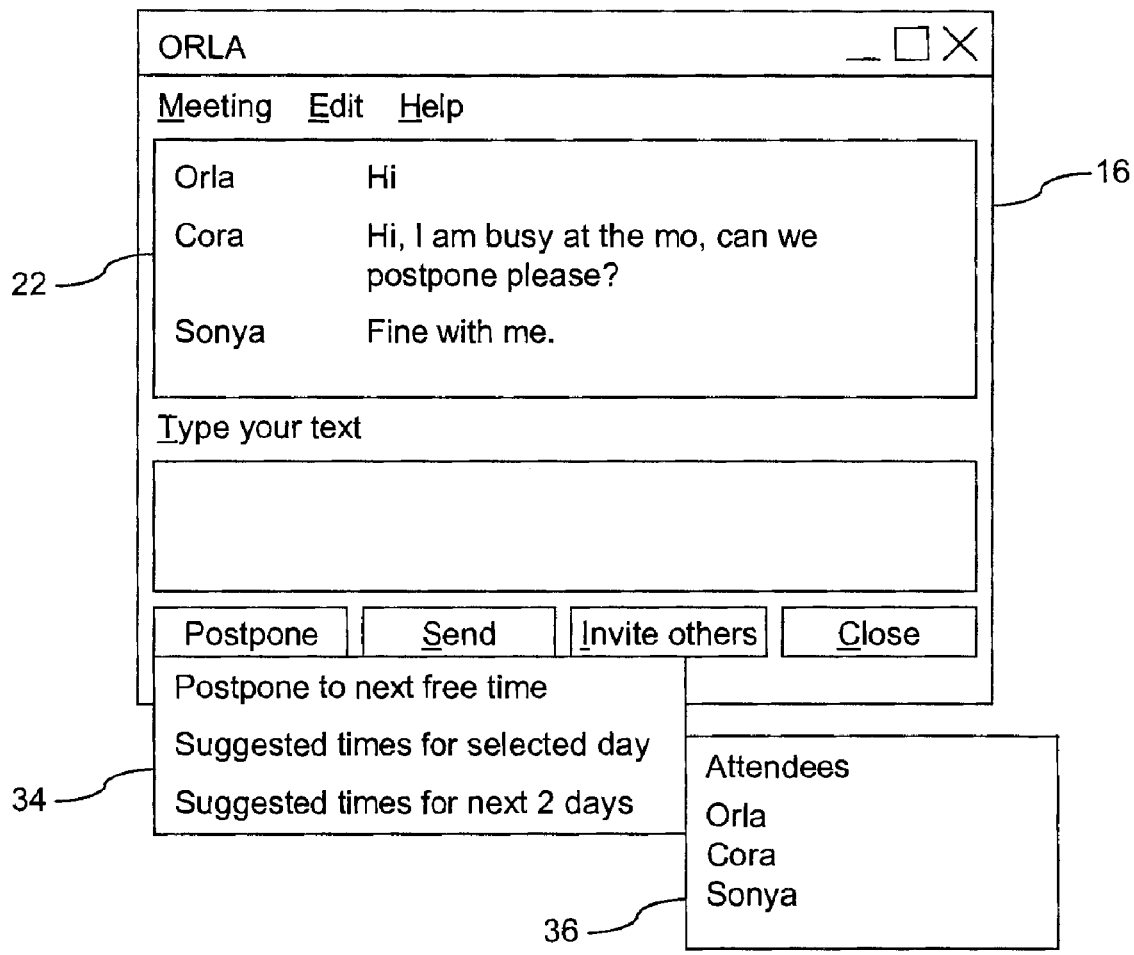
FIG. 4 is a further screenshot an instant messaging dialogue session.
Figure 5:
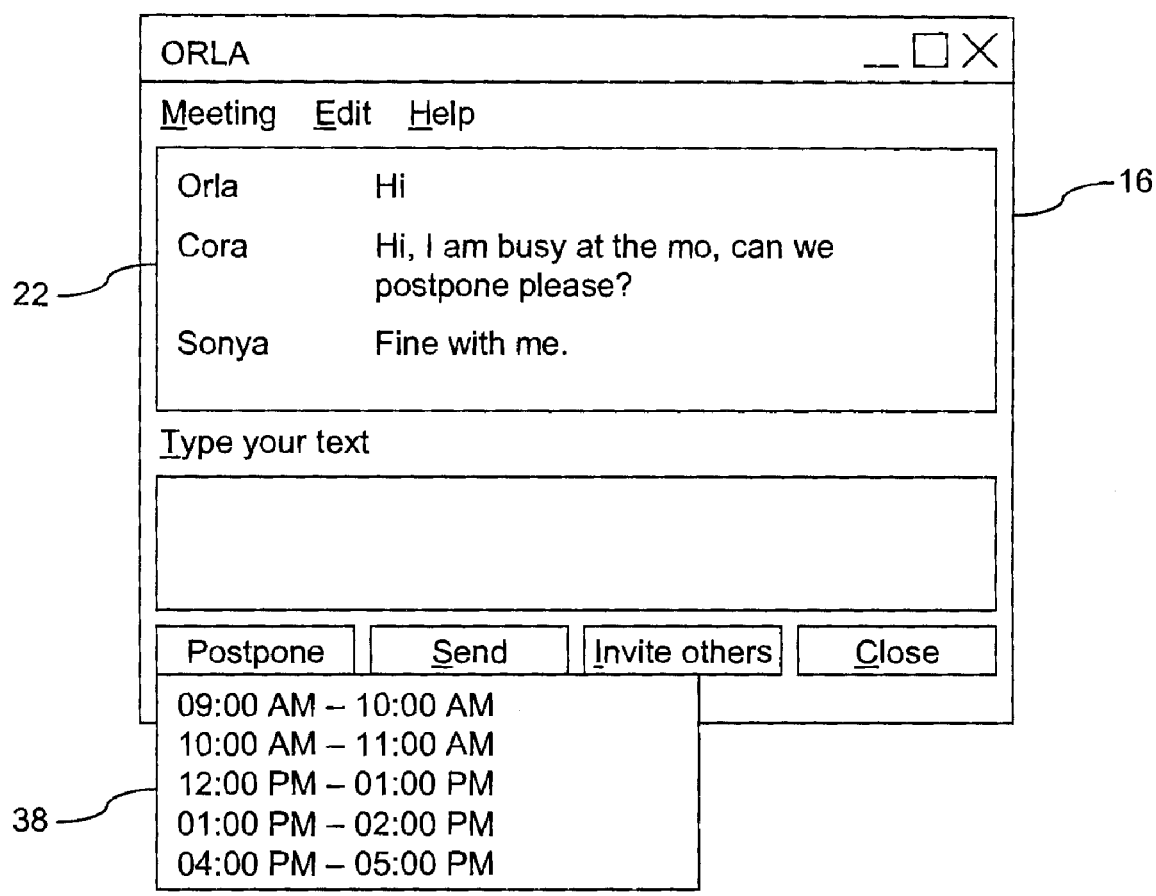
FIG. 5 is a third screenshot an instant messaging dialogue session.

3. Orla clicks the postpone button 32, as shown in FIG. 4, which brings up a window 34 with options for the scheduling process. When Orla selects "Suggested times for selected day", then another new window 36 is brought up which allows Orla to select the attendees for the rescheduled instant messaging session. Once this is done, then the available time slots appear, as shown in FIG. 5, and she chooses a time that is suitable for all. The function of the postpone button 32 accesses the free time in each of the attendees calendars regardless of the software used.

4. When the time comes the previous chat appears with the text and they are able to continue their chat and Orla gets a resolution to her issue.

There are many situations where such conversations involve more that two parties. Very often there are numerous parties involved in a conversation. Instant messaging is used as a method of communication between people across many locations. This invention would facilitate the scheduling of an instant messaging session when it suits all parties.

This instant messaging system can incorporate the following concepts:

The user who postponed the conversation originally would be the person who decides to continue the conversation.

If all attendees are present apart from the person who started the conversation, then the conversation would not take place and the user would be required to reschedule the meeting when they login to their messaging application.

If the user who proposed the conversation is the only person present then a meeting cannot happen without the other parties. The user would postpone the meeting for another suitable time.

Ideally delayed conversations need to be completed within 48 hours. For a contract to be resolved there would be a limit to the look ahead of time when scheduling a meeting.

A user can make changes to the mandatory list of attendees.

There is a formalized contract within the instant messaging system that allows for the resumption of conversations and the successful completion of this agreement. When a user fails to finish an conversation an implied contract has not been fulfilled. By formalizing the implied contract with a definite meeting and successfully completing the meeting we would see the agreement completed.

When there are a number of people involved in a multi-way conversation, not all parties are required. By using the postpone button 32 in the instant messaging application conversation a person could be selected as a compulsory attendee and they would have to be free to attend the meeting. Their nearest available free time would be considered first. The list of required attendees would be configurable by the user. By picking the free time, we would be renewing the conversation, and as a result would be motivating the completion of the contract.

By using this invention, it is possible to have more successfully completed instant messaging conversations as well as more success using the instant messaging tool. Currently when an instant messaging conversation is broken there is little chance of it being completed. By using this invention instant messaging users will be able to use the instant messaging schedule option to get a satisfactory conclusion and a successful contract.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem. Computer readable storage medium being at least one physical storage medium including the above-mentioned non-writable storage media and/or the above-mentioned writable storage media.

While the invention is described through the above exemplary embodiments, it will be understood by those of ordinary skill in the art that modification to and variation of the illustrated embodiments may be made without departing from the inventive concepts herein disclosed.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

We claim:

1. A method, performed in at least one computer system, of operating an instant messaging application comprising:
    running a current instant messaging dialogue session across a plurality of participant devices;
    responsive to receiving a postponement signal from a participant device during the current instant messaging dialogue session, said computer system determining a future restart time and future participant devices, terminating the current instant messaging dialogue session, and initiating a new instant messaging dialogue session at the restart time for the future participant devices;
    responsive to receipt of the postponement signal from a participant device, storing a conversation file comprising the instant messaging dialogue session; and
    following initiation of the new instant messaging dialogue session at the restart time, displaying the conversation file at respective future participant devices of the new instant messaging dialogue session.

2. The method according to claim 1, wherein the step of determining the restart time comprises accessing a calendar application of at least one participant device and accordingly scheduling a future restart time.

3. The method according to claim 1, wherein the step of determining the restart time comprises receiving scheduling data from at least one participant device and accordingly scheduling a future restart time.

4. The method according to claim 1, and further comprising inserting a calendar entry into a calendar application of at least one future participant device, the calendar entry comprising the scheduled future restart time.

5. The method according to claim 1, and further comprising, prior to initiation of the new instant messaging dialogue session at the restart time, receiving rescheduling data from at least one future participant device and accordingly rescheduling a new future restart time.

6. The method according to claim 1, and further comprising, prior to initiation of the new instant messaging dialogue session at the restart time, transmitting a reminder signal to each future participant device.

7. The method according to claim 1, and further comprising, immediately prior to initiation of the new instant messaging dialogue session at the restart time, determining whether each future participant device is connected to the instant messaging application, and if not, rescheduling a new future restart time.

8. A system for operating an instant messaging application comprising:
    an instant messaging server, comprising at least one processor, running a current instant messaging dialogue session across a plurality of participant devices, the instant messaging server arranged, responsive to receipt of a postponement signal from a participant device during the current instant messaging dialogue session, to determine a future restart time and future participant devices, to terminate the current instant messaging dialogue session, and to initiate a new instant messaging dialogue session at the restart time for the future participant devices,
    wherein the instant messaging server is arranged, responsive to receipt of the postponement signal from a participant device, to store a conversation file comprising the instant messaging dialogue session, and
    wherein the instant messaging server is arranged, following initiation of the new instant messaging dialogue session at the restart time, to display the conversation file at respective future participant devices of the new instant messaging dialogue session.

9. The system according to claim 8, wherein the instant messaging server is arranged, when determining the restart time, to access a calendar application of at least one participant device and accordingly to schedule a future restart time.

10. The system according to claim 8, wherein the instant messaging server is arranged, when determining the restart time, to receive scheduling data from at least one participant device and accordingly to schedule a future restart time.

11. The system according to claim 8, wherein the instant messaging server is further arranged to insert a calendar entry into a calendar application of at least one future participant device, the calendar entry comprising the scheduled future restart time.

12. The system according to claim 8, wherein the instant messaging server is further arranged, prior to initiation of the new instant messaging dialogue session at the restart time, to receive rescheduling data from at least one future participant device and accordingly to reschedule a new future restart time.

13. The system according to claim 8, wherein the instant messaging server is further arranged, prior to initiation of the new instant messaging dialogue session at the restart time, to transmit a reminder signal to each future participant device.

14. The system according to claim 8, wherein the instant messaging server is further arranged, immediately prior to initiation of the new instant messaging dialogue session at the restart time, to determine whether each future participant device is connected to the instant messaging application, and if not, to reschedule a new future restart time.

15. A computer program product embodied in a computer readable storage medium comprising instructions which when executed implement an instant messaging application, the instructions comprising:
    instructions for running a current instant messaging dialogue session across a plurality of participant devices;
    instructions for receiving a postponement signal from a participant device during the current instant messaging dialogue session;
    instructions for, responsive to receiving the postponement signal during the current instant messaging dialogue session, determining a future restart time and future participant devices, terminating the current instant messaging dialogue session, and initiating a new instant messaging dialogue session at the restart time for the future participant devices;

instructions for, responsive to receipt of the postponement signal from a participant device, storing a conversation file comprising the instant messaging dialogue session; and instructions for, following initiation of the new instant messaging dialogue session at the restart time, displaying the conversation file at respective future participant devices of the new instant messaging dialogue session.

16. The computer program product according to claim 15, wherein the instruction for determining the restart time comprises instructions for accessing a calendar application of at least one participant device and accordingly scheduling a future restart time.

17. The computer program product according to claim 15, wherein the instruction for determining the restart time comprises instructions for receiving scheduling data from at least one participant device and accordingly scheduling a future restart time.

18. The computer program product according to claim 15, and further comprising an instruction for inserting a calendar entry into a calendar application of at least one future participant device, the calendar entry comprising the scheduled future restart time.

19. The computer program product according to claim 15, and further comprising instructions for, prior to initiation of the new instant messaging dialogue session at the restart time, receiving rescheduling data from at least one future participant device and accordingly rescheduling a new future restart time.

20. The computer program product according to claim 15, and further comprising instructions for, prior to initiation of the new instant messaging dialogue session at the restart time, transmitting a reminder signal to each future participant device.

21. The computer program product according to claim 15, and further comprising instructions for, immediately prior to initiation of the new instant messaging dialogue session at the restart time, determining whether each future participant device is connected to the instant messaging application, and if not, rescheduling a new future restart time.

\* \* \* \* \*